E. GEIGER.
ROTARY SPRINKLER.
APPLICATION FILED DEC. 23, 1912.
1,078,727.
Patented Nov. 18, 1913.
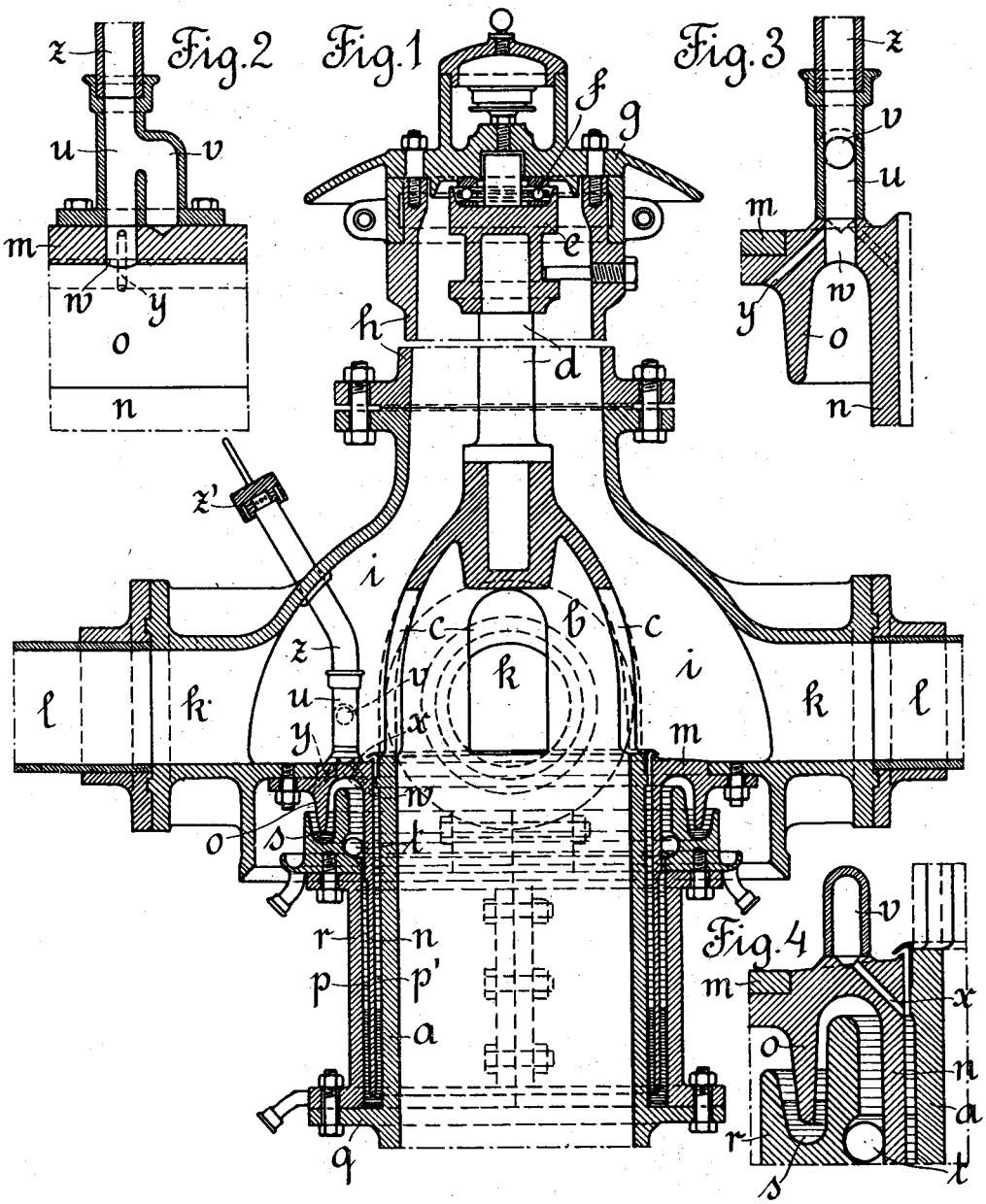
Witnesses—
Stanley Wood
John T. Bush
Inventor
Eugen Geiger
by
Attorney.

UNITED STATES PATENT OFFICE.

EUGEN GEIGER, OF KARLSRUHE, GERMANY.

ROTARY SPRINKLER.

1,078,727.　　　　　Specification of Letters Patent.　　Patented Nov. 18, 1913.

Application filed December 23, 1912.　Serial No. 738,299.

*To all whom it may concern:*

Be it known that I, EUGEN GEIGER, a subject of the German Emperor, residing at Karlsruhe, Baden, Germany, have invented a certain new and useful Rotary Sprinkler, of which the following is a specification.

This invention relates to a so-called rotary sprinkler, that is, an apparatus especially applicable for the irrigation of fields with fecal or other water, operating in the same manner as the Segner re-action wheel, consisting chiefly of a stand pipe and a rotary body having radial pipes mounted thereon, from which pipes the water entering the rotary body from the stand pipe under pressure is expelled through a series of lateral holes provided along the whole length thereof, whereby the rotary body with the radial pipes is rotated around the axial stand pipe in consequence of the re-action, so that the whole ground surface, which surrounds the latter and which is limited by a circle described by the outer extremities of the radial pipes is uniformly irrigated. In this rotary sprinkler, the seal of the annular groove between the stand pipe and the base of the rotary body is effected by two mercury and glycerin seals between which is provided the lower ball bearing of the rotary body. In the known rotary sprinklers of this type, it occurs, that in consequence of strong water impacts in the interior of the rotary body, to which the inner mercury and glycerin seals are also exposed, and which are transmitted by this to the outer seal, of which the contents is wholly or partially thrown out, and that on the recoil of the contents of the inner seal subsequent to such an impact a portion of the glycerin escapes toward the interior of the rotary body.

The invention is for the purpose of automatically equalizing such losses in the liquid for the seals.

In the accompanying drawing Figure 1 shows a vertical section of a rotary sprinkler provided according to this invention, while Figs. 2 to 4 show the most important part in three different sections.

The stand pipe $a$ is closed at the top by a hood $b$ which is provided with four openings $c$ and carries a column $d$. On this column is mounted a pan $e$ in which a ball bearing $f$ is provided. On this bearing rests a cover $g$ which closes the upper end of the pipe $h$ provided on the hood-like rotary body $i$. The latter is provided with four radial pipe supports $k$, each having a flange, to which the radial sprinkler tubes $l$, also provided with flanges, are bolted.

The detachable base $m$ of the rotary body $i$ is provided with two downwardly projecting concentric ring members $n$ and $o$. The inner ring member $n$ projects freely into the annular space $p$ $p^1$ between the stand pipe $a$ and the cylinder $r$, surrounding the latter and mounted upon a flange $q$, which space is partly filled with mercury and partly with glycerin.

The outer short member $o$ projects freely into a groove $s$ of the upper part of the cylinder $r$ which also is filled partly with mercury and partly with glycerin. Between the member $n$ and the upper part of the cylinder $r$ there are provided in an annular groove of the latter a series of balls $t$ forming a bearing. On the base $m$ of the rotary body $i$ is mounted a tubular member $u$ having a branch $v$. This tubular member is by means of a boring $w$ in the base $m$ in communication with an air chamber provided below the latter and between the members $n$ and $o$, while the branch $v$ is by means of an inclined narrow passage $x$ in the base $m$ in communication with the annular space $p^1$ between the member $n$ and the stand pipe $a$.
A second passage $y$ in the base $m$ leads from the boring $w$ to the exterior of the member $o$. From the tubular member $u$ also leads upward through the walls of the rotary body $i$ a pipe $z$ of which the outer extremity is provided with a closing cap $z^1$ having a number of small holes.

When there is a strong water impact in the interior of the rotary body $i$, the air, which is expelled by the gylcerin passing upwardly outward from the chamber $p$, can escape into the atmosphere through the tubular member $u$, the pipe $z$ and the holes in the cap $z^1$, and the glycerin rises in the tubular member $u$. In this manner a portion of the glycerin passes into the branch $v$, from where it passes into the annular space $p^1$ through the passage $x$, after the usual pressure condition in the interior of the rotary body $i$ which is in communication with this space is again produced. In this manner the glycerin, which on the recoil subsequent to the water impact passed out of the space $p^1$ into the interior of the rotary body $i$, is automatically replaced. In a similar manner a portion of the glycerin from the tubular member $u$ passes through the passage $y$ into the outer part of the groove $s$ whereby the glycerin which may have been expelled from this groove on the water impact is replaced. The annular space $p$ from which the necessary glycerin is removed for supplementing the contents of the chamber $p^1$ and the outer part of the groove $s$, must therefore be replenished periodically through the tube $z$ and the tubular member $u$.

Having thus described my invention, what I claim as new and useful, and desire to secure by Letters Patent, is:—

1. In a rotary sprinkler the combination of a stand pipe, a rotary body mounted thereon, radial sprinkler tubes fixed to said rotary body, two downwardly projecting concentric ring members provided on the base of said rotary body, a cylinder surrounding said stand pipe, and spaced therefrom to form an annular chamber, an annular groove provided in the top of said cylinder, said annular chamber and groove being filled partly with mercury and partly with glycerin, said ring members projecting freely into said annular chamber and groove respectively, a ball bearing provided between said cylinder and the inner of said ring members and substantially above the mercury contained in said annular chamber, a tubular member mounted on the base of said rotary body and provided with a branch, and an air chamber provided below the base of said rotary body and between said ring members, said tubular member and branch being in communication with said air chamber and with the inner part of said annular chamber respectively.

2. In a rotary sprinkler the combination of a stand pipe, a rotary body mounted thereon, radial sprinkler tubes fixed to said rotary body, two downwardly projecting concentric ring members provided on the base of said rotary body, a cylinder surrounding said stand pipe, and spaced therefrom to form an annular chamber, an annular groove provided in the top of said cylinder, said annular chamber and groove being filled partly with mercury and partly with glycerin, said ring members projecting freely into said annular chamber and groove respectively, a ball bearing provided between said cylinder and the inner of said ring members and substantially above the mercury contained in said annular chamber, a tubular member mounted on the base of said rotary body and provided with a branch, and an air chamber provided below the base of said rotary body and between said ring members, said tubular member being in communication with said air chamber and with the exterior of the outer of said ring members projecting into said annular groove, and said branch being in communication with the inner part of said annular chamber.

3. In a rotary sprinkler the combination of a stand pipe, a rotary body mounted thereon, radial sprinkler tubes fixed to said rotary body, two downwardly projecting concentric ring members provided on the base of said rotary body, a cylinder surrounding said stand pipe, and spaced therefrom to form an annular chamber, an annular groove provided in the top of said cylinder, said annular chamber and groove being filled partly with mercury and partly with glycerin, said ring members projecting freely into said annular chamber and groove respectively, a ball bearing provided between said cylinder and the inner of said ring members and substantially above the mercury contained in said annular chamber, a tubular member mounted on the base of said rotary body and provided with a branch, an air chamber provided below the base of said rotary body and between said ring members, said tubular member and branch being in communication with said air chamber and with the inner part of said annular chamber respectively, and a pipe leading from said tubular member upward through the walls of said rotary body.

4. In a rotary sprinkler the combination of a stand pipe, a rotary body mounted thereon, radial sprinkler tubes fixed to said rotary body, two downwardly projecting concentric ring members provided on the base of said rotary body, a cylinder surrounding said stand pipe and spaced therefrom to form an annular chamber, an annular groove provided in the top of said cylinder, said annular chamber and groove being filled partly with mercury and partly with glycerin, said ring members projecting freely into said annular chamber and groove respectively, a ball bearing provided between said cylinder and the inner of said ring members and substantially above the mercury contained in said annular chamber, a tubular member mounted on the base of said rotary body, and provided with a branch, an air chamber provided below the base of said rotary body and between said ring members, said tubular member being in communication with said air chamber and with the exterior of the outer of said ring members projecting into said annular groove, and said branch being in communication with the inner part of said annular chamber, and a pipe leading from said tubular member upward through the walls of said rotary body.

5. In a rotary sprinkler the combination of a stand pipe, a rotary body mounted thereon, radial sprinkler tubes fixed to said rotary body, two downwardly projecting ring members provided on the base of said rotary body, a cylinder surrounding said stand pipe, and spaced therefrom to form an annular chamber, an annular groove provided in the top of said cylinder, said annular chamber and groove being filled partly with mercury and partly with glycerin, said ring members projecting freely into said annular chamber and groove respectively, a ball bearing provided between said cylinder and the inner of said ring members and substantially above the mercury contained in said annular chamber, a tubular member mounted on the base of said rotary body and provided with a branch, an air chamber provided below the base of said rotary body and between said ring members, a boring provided in the base of said rotary body and connecting said tubular member with said air chamber, and a passage also provided in said base and connecting said branch with the inner part of said annular chamber.

6. In a rotary sprinkler the combination of a stand pipe, a rotary body mounted thereon, radial sprinkler tubes fixed to said rotary body, two downwardly projecting concentric ring members provided on the base of said rotary body, a cylinder surrounding said stand pipe, and spaced therefrom to form an annular chamber, an annular groove provided in the top of said cylinder, said annular chamber and groove being filled partly with mercury and partly with glycerin, said ring members projecting freely into said annular chamber and groove respectively, a ball bearing provided between said cylinder and the inner of said ring members and substantially above the mercury contained in said annular chamber, a tubular member mounted on the base of said rotary body and provided with a branch, an air chamber provided below the base of said rotary body and between said ring members, a boring provided in the base of said rotary body and connecting said tubular member with said air chamber, a passage also provided in said base and connecting said branch with the inner part of said annular chamber, and a second passage in said base leading from said boring to the exterior of the outer of said ring members.

7. In a rotary sprinkler the combination of a stand pipe, a rotary body mounted thereon, radial sprinkler tubes fixed to said rotary body, two downwardly projecting concentric ring members provided on the base of said rotary body, a cylinder surrounding said stand pipe, and spaced therefrom to form an annular chamber, an annular groove provided in the top of said cylinder, said annular chamber and groove being filled partly with mercury and partly with glycerin, said ring members projecting freely into said annular chamber and groove respectively, a ball bearing provided between said cylinder and the inner of said ring members and substantially above the mercury contained in said annular chamber, a tubular member mounted on the base of said rotary body and provided with a branch, an air chamber provided below the base of said rotary body and between said ring members, a boring provided in the base of said rotary body and connecting said tubular member with said air chamber, a passage also provided in said base and connecting said branch with the inner part of said annular chamber, a second passage in said base leading from said boring to the exterior of the outer of said ring members, and a pipe leading from said tubular member upward through the walls of said rotary body.

In testimony whereof I have hereunto signed my name in the presence of two subscribing witnesses.

EUGEN GEIGER.

Witnesses:
AUGUST OHEIENSS,
J. R. CRISTY.